United States Patent
Xu et al.

(10) Patent No.: US 10,692,368 B2
(45) Date of Patent: *Jun. 23, 2020

(54) DETECTION OF VEHICLE QUEUEING EVENTS ON A ROAD

(71) Applicant: International Business Machines Corporation, Armonk, NY (US)

(72) Inventors: Jing Xu, Xian (CN); Yang Zhang, Xian (CN); Jun Wang, Xian (CN); Ji Hui Yang, Xian (CN); Wen Pei Yu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,124

(22) Filed: Jun. 18, 2019

(65) Prior Publication Data

US 2019/0304298 A1    Oct. 3, 2019

Related U.S. Application Data

(63) Continuation of application No. 15/877,889, filed on Jan. 23, 2018.

(51) Int. Cl.
*G08G 1/08* (2006.01)
*G08G 1/09* (2006.01)
(Continued)

(52) U.S. Cl.
CPC .............. *G08G 1/08* (2013.01); *G06F 16/254* (2019.01); *G08G 1/0112* (2013.01);
(Continued)

(58) Field of Classification Search
CPC ...... G08G 1/08; G08G 1/0116; G08G 1/0112; G08G 1/0145; G08G 1/093; G06F 16/254
See application file for complete search history.

(56) References Cited

U.S. PATENT DOCUMENTS 8,103,435 B2   1/2012  Yang et al.
8,253,592 B1 *  8/2012  Chandra ................. G08G 1/07
                                                     340/907
(Continued)

FOREIGN PATENT DOCUMENTS

CN   102855760 B    8/2014
CN   106251642 A    12/2016

OTHER PUBLICATIONS

COMERT, Queue length estimation from probe vehicles at isolated intersections: Estimators for primary parameters, European Journal of Operational Research, vol. 252, Issue 2, (Jul. 16, 2016), pp. 502-521.

(Continued)

*Primary Examiner* — Russell Frejd
(74) *Attorney, Agent, or Firm* — Richard Wilhelm; SVL IPLaw Edell, Sharpiro & Finnan, LLC (57) ABSTRACT

A method, system and computer program product are provided for detecting vehicle queue events and managing traffic flow. A computing system recognizes whether a queue event occurred for each vehicle located in an area of interest based on collected vehicle data. The area of interest includes an intersection, and the vehicle data for the each vehicle includes location information and speed information. The location information further includes a distance to an intersection. The computing system identifies differences in queue length among queues in the area of interest based on the vehicle data and determines queue indicators for each of the queues in the area of interest. Based on queue indicators for each of the queues in in the area of interest generated over multiple sampling periods, traffic signal lights at the intersection in the area of interest are managed.

6 Claims, 8 Drawing Sheets

(51) Int. Cl.
*G06F 16/25* (2019.01)
*G08G 1/01* (2006.01)

(52) U.S. Cl.
CPC ......... *G08G 1/0116* (2013.01); *G08G 1/0145* (2013.01); *G08G 1/093* (2013.01)

(56) References Cited

U.S. PATENT DOCUMENTS

| | | | |
|---|---|---|---|
| 2013/0099942 A1* | 4/2013 | Mantalvanos | G08G 1/082 340/910 |
| 2014/0114885 A1* | 4/2014 | Han | G06N 3/0454 706/12 |
| 2017/0076227 A1 | 3/2017 | Elgie et al. | |
| 2018/0045832 A1* | 2/2018 | Ibrahim | G01S 17/936 |
| 2018/0174448 A1* | 6/2018 | Gomez Gutierrez | G08G 1/08 |
| 2019/0228649 A1 | 7/2019 | Xu et al. | |

OTHER PUBLICATIONS

Ban et al., Real Time Queue Length Estimation for Signalized Intersections Using Travel Times from Mobile Sensor, Transportation Research Part C: Emerging Technologies, vol. 19, Issue 6, Dec. 2011, pp. 1133, 1156, Traffic data processing for classifying traffic situation.

Qi et al., Estimating Average Maximum Queue Length Using Probe Vehicle GPS Data with Long Reporting Intervals, Department of Industrial Engineering, (Jan. 2017), pp. 1-15.

List of IBM Patents or Patent Applications Treated as Related, filed Jun. 18, 2019.

Xiong et al., "Dynamic Division Method of Intersection Range Based on Floating Vehicle Data," Traffic Information and Safety, vol. 27, No. 151, 2009, Issue 151, 10 pages with English language machine translation.

\* cited by examiner

DETECTION OF VEHICLE QUEUEING EVENTS ON A ROAD

BACKGROUND

Present invention embodiments relate to systems, methods and computer program products for detecting and analyzing vehicle queue events. In particular, the present invention embodiments relate to recognizing vehicle queue events, performing an in-depth analysis of queues at an intersection, and managing signal lights at an intersection based on results of the in-depth analysis.

Intersections with traffic signals generally have a lower traffic capacity than a conventional road without traffic signals due to occurrences of red lights from the traffic signals. When the traffic capacity of an intersection with a traffic signal is lower than a transportation demand, vehicles tend to form one or more queues.

Vehicles may form the queues for a number of reasons such as, for example, a red light from traffic signals, a traffic accident, a traffic jam, etc. Further, at many intersections traffic signals may be configured individually for a left turn lane and one or more through-traffic lanes. As a result, multiple queues having different lengths may form at such intersections.

SUMMARY

In a first aspect of embodiments of the invention, a machine-implemented method is provided for detecting vehicle queue events and managing traffic flow. A computing system recognizes whether a queue event occurred for each vehicle located in an area of interest based on collected vehicle data. The area of interest includes an intersection, and the vehicle data for the each vehicle includes location information and speed information. The location information further includes a distance to the intersection. Based on the vehicle data, the computing system identifies differences in queue length among queues in the area of interest. The computing system determines queue indicators for each of the queues in the area of interest. Further, the machine-implemented method includes managing signal lights at the intersection in the area of interest based on multiple sets of the queue indicators for the each of the queues in the area of interest.

In a second aspect of embodiments of the invention, a system is provided for detecting vehicle queue events and managing traffic flow. The system includes at least one processor and at least one memory connected with the at least one processor. The at least one processor in configured to perform: recognizing whether a queue event occurred for each vehicle located in an area of interest based on collected vehicle data for the each vehicle, the area of interest including an intersection, and the vehicle data for the each vehicle including location information and speed information, the location information further including a distance to the intersection; identifying differences in queue length among queues in the area of interest based on the vehicle data; and determining queue indicators for each of the queues in the area of interest. Traffic signal lights at the intersection in the area of interest are managed based on sets of queue indicators for the each of the queues in the area of interest generated over multiple sampling periods.

In a third aspect of embodiments the invention, a computer program product is provided. The computer program product includes at least one computer readable storage medium having computer readable program code embodied therewith for execution on at least one processor. The computer readable program code is configured to be executed by the at least one processor to perform: recognizing whether a queue event occurred for each vehicle located in an area of interest based on collected vehicle data for the each vehicle, the area of interest including an intersection, and the vehicle data for the each vehicle including location information and speed information, the location information further including a distance to the intersection; identifying differences in queue length among queues in the area of interest based on the vehicle data; determining sets of queue indicators for each of the queues in the area of interest; and managing traffic signal lights at the intersection of interest based on the queue indicators for the each of the queues in the area of interest generated over multiple sampling periods.

BRIEF DESCRIPTION OF THE DRAWINGS

Generally, like reference numerals in the various figures are utilized to designate like components.

DETAILED DESCRIPTION

Present invention embodiments include methods, systems and computer program products for detecting vehicle queue events, providing a number of queue indicators related to the detected vehicle queue events and managing traffic flow based on the provided queue indicators. Various embodiments may recognize a beginning of a queue event in an area of interest on a road based on collected vehicle data. The vehicle data may include location information and speed information regarding vehicles located in the area of interest.

A queue event may be recognized when a speed of one or more vehicles in the area of interest drops below a speed threshold or is completely stopped. In one embodiment, the speed threshold may be 20 kilometers per hour (12.4 miles per hour). In other embodiments, another suitable value for the speed threshold may be used. Vehicles in the area of interest that are determined as initially having a speed less than the speed threshold or completely stopped may have their respective states set to an initial low-speed state. Vehicles in the area of interest that are determined as having a speed less than the speed threshold or completely stopped and have previously been determined to be in the initial low-speed state in the area of interest may have their respective states set to a subsequent low-speed state.

A distance from an initial low-speed state point of each respective vehicle in the area of interest to a beginning of a respective queue that includes the respective vehicle may be determined. The initial low-speed state points of the respective vehicles may be clustered based on the determined distance of each of the respective vehicles to produce at least one cluster. Each of the at least one cluster may be treated as a respective queue. When the at least one cluster includes two or more clusters, a length of corresponding queues may be determined. When a difference in queue length that is greater than a difference threshold is determined, then a queue direction of the corresponding queues may be determined. The difference threshold may have a value of two, three or another suitable value. A number of queue indicators for each queue in the area of interest may be determined and dynamically displayed on one or more remote display screens. Signal lights at the intersection of interest may be managed based on the queue indicators for the each queue in the area of interest.

Figure 1:
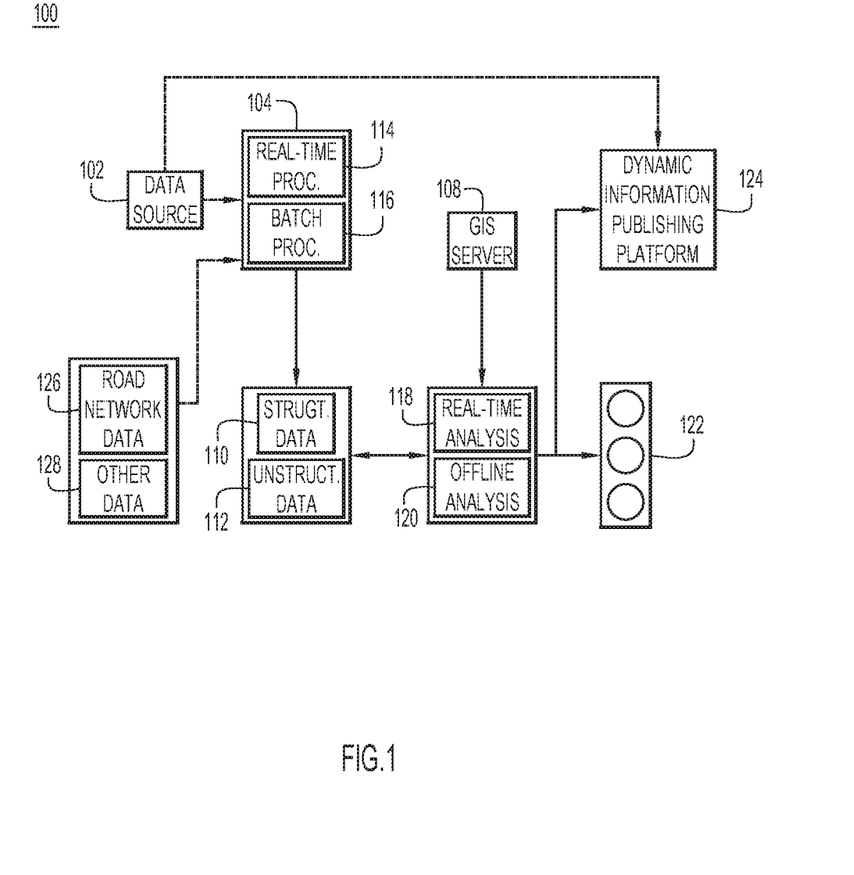
FIG. 1 illustrates an example system architecture in which embodiments of the invention may be implemented.

FIG. 1 illustrates an example system architecture 100 for various embodiments of the invention. System architecture 100 may include a data source 102 that may provide speed and location information of one or more vehicles in an area of interest to an Extract, Transform and Load (ETL) device 104. ETL device 104 may receive the speed and location information, as well as road network data 126, including information regarding locations in an area, which may include but not be limited to, street names, individual addresses, business names and addresses, traffic signal locations, etc., as well as other data 128. ETL device 104 may process, by real-time processing 114 and/or batch processing 116, the received speed and location information, road network data 126 and other data 128 to produce transformed information, which may be stored as structured data 110 and unstructured data 112. Structured data 110 and unstructured data 112 may be provided to Geographic Information System (GIS) server 108 for real-time analysis 118 and/or off-line analysis 120.

Geographic Information System (GIS) server 108 may receive vehicle sample points from consecutive sampling times of areas of interest and may generate a trajectory vector map for determining a direction of a queue. GIS server 108 may provide traffic signal management information to a traffic signal 122 to optimize operation of traffic signal 122 based on real-time analysis 118 and/or offline analysis 120.

In some embodiments, data from real-time analysis 118 may be provided to a Dynamic Information Publishing Platform (DIPP) 124, which may dynamically publish information in real-time such as, for example, multiple queue indicators, to a number of display screens or other presentation devices including, but not limited to, printers. In some embodiments, DIPP 124 may include a web server that may publish the information on a web page that may be monitored by one or more devices. Some devices may detect a change to the published information and may provide the published information to presentation devices.

Figure 2:
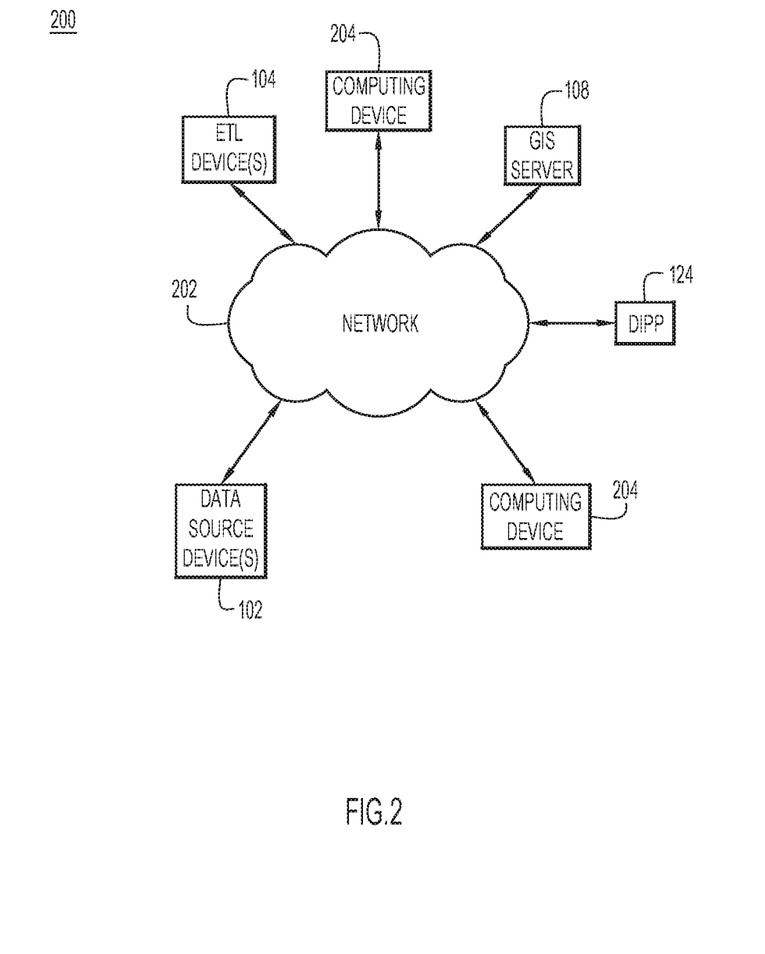
FIG. 2 shows an example operating environment in which embodiments of the invention may operate.

FIG. 2 illustrates an example environment 200 in which embodiments may operate. Environment 200 may include one or more Extract, Transform and Load (ETL) devices 104, one or more data source devices 102, one or more computing devices 204, GIS server 108 and DIPP 124, each of which have a wired or wireless connection to a network 202. Network 202 may include one or more networks such as a local area network (LAN), a general wide area network (WAN), a public network (e.g., the Internet) or any combination thereof.

Figure 3:
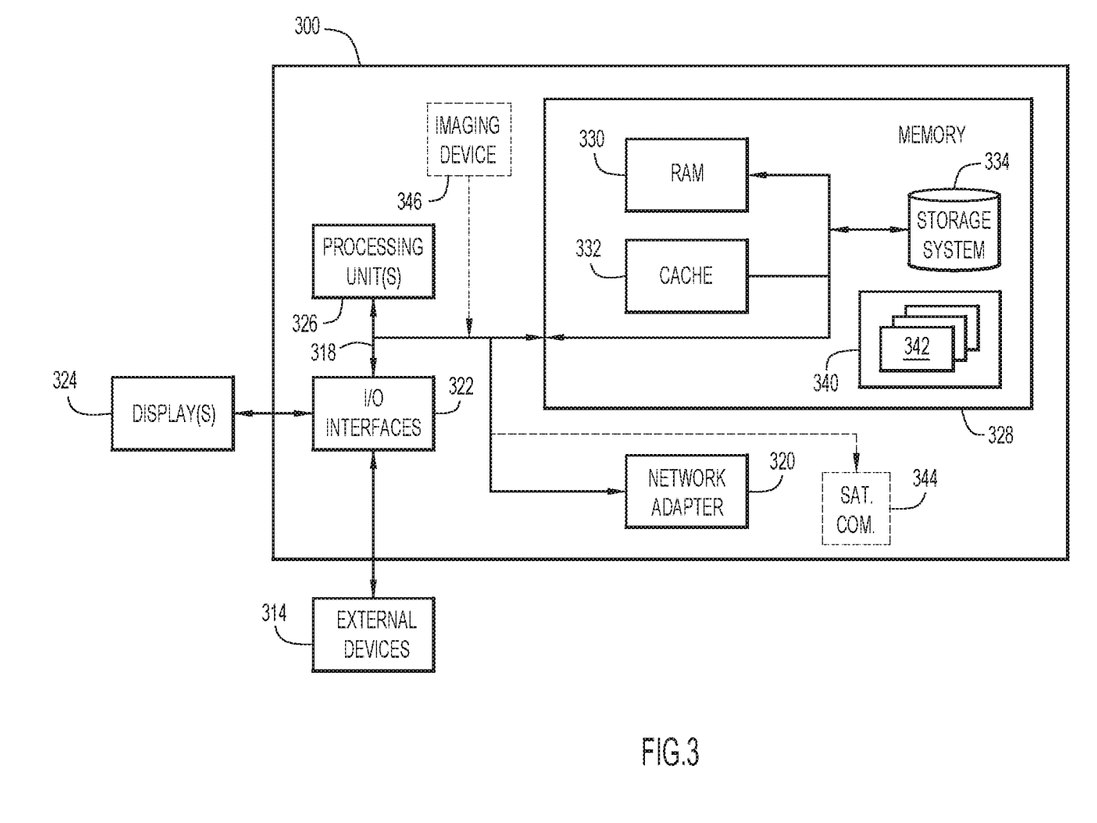
FIG. 3 is a functional block diagram of a computing system that may be used to implement various portions of embodiments of the invention.

FIG. 3 is a functional block diagram of a computing system 300 that may implement any of data source 102, ETL device 104, GIS server 108, DIPP 124 and computing device 204 in various embodiments of the invention. Computing system 300 is shown in a form of a general-purpose computing device. Components of computing system 300 may include, but are not limited to, one or more processors or processing units 326, a system memory 328, one or more Input/Output (I/O) interfaces 322, a network adapter 320 and a bus 318 that couples various system components including system memory 328, one or more I/O interfaces 322, and network adapter 320 to one or more processing units 326.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 300 typically includes a variety of computer system readable media. Such media may be any available media that is accessible by computing system 300, and may include both volatile and non-volatile media, removable and non-removable media.

System memory 328 can include computer system readable media in the form of volatile memory, such as random access memory (RAM) 330 and/or cache memory 332. Computing system 300 may further include other removable/non-removable, volatile/non-volatile computer system storage media. By way of example only, storage system 334 can be provided for reading from and writing to a non-removable, non-volatile magnetic media (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, the one or more application programs, the other program modules, and the program data or some combination thereof, may include an implementation of a networking environment. Program modules 342 generally carry out the functions and/or methodologies of embodiments of the invention as described herein.

Computing system 300 may also communicate with one or more external devices 314 such as a keyboard, a pointing device, one or more displays 324 and/or printers, one or more devices that enable a user to interact with computing system 300, and/or any devices (e.g., network card, modem, etc.) that enable computing system 300 to communicate with one or more other computing devices. Such communication can occur via Input/Output (I/O) interfaces 322. Still yet, computing system 300 may communicate with one or more networks such as a local area network (LAN), a general wide area network (WAN), and/or a public network (e.g., the Internet) via network adapter 320. As depicted, network adapter 320 communicates with the other components of computing system 300 via bus 318. It should be understood that, although not shown, other hardware and/or software components could be used in conjunction with computing system 300. Examples, include, but are not limited to: microcode, device drivers, redundant processing units, external disk drive arrays, RAID systems, tape drives, and data archival storage systems, etc.

In some embodiments, when computing system 300 implements data source 102, computing system 300 may include a satellite communication device 344 for communicating with a number of Global Positioning System (GPS) satellites. Some embodiments of data source 102 may include an imaging device 346 for capturing images of vehicles in an area of interest, identifying each of the vehicles, estimating their location positions and speed, and providing the estimated location positions, identifying information and the speed to a computing device such as, for example, ETL device 104.

Figure 4:
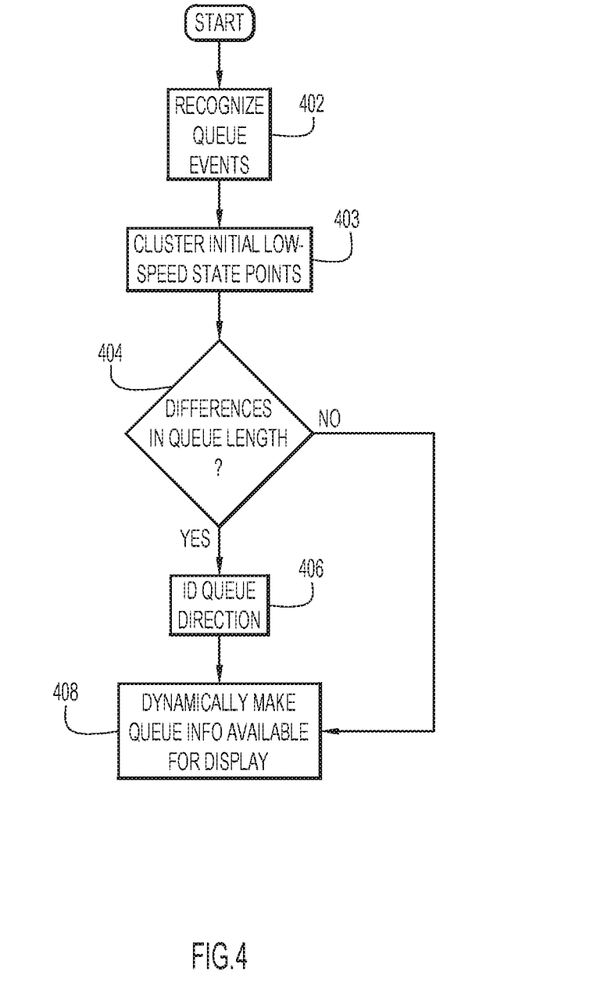
FIG. 4 is a flowchart of an example process that may be performed to recognize queue events, cluster initial low-speed state points in an area of interest, identify a queue direction, and calculate and make available queue indicators for display according to embodiments of the invention.

FIG. 4 is a flowchart of an overall example process that may be performed according to embodiments of the invention. The process may execute, at least partially, in ETL device 104 and GIS server 108. In some embodiments, the process may execute completely in GIS server 108. In other embodiments, the process may execute in a combination of computing devices.

The process analyzes vehicle data collected from areas of interest every predefined sampling time period. The predefined sampling time period may be 10 seconds, 15 seconds, or another suitable time period. The collected vehicle data for each vehicle in an area of interest may include, but not be limited to, vehicle identifying information, location information and vehicle speed. The vehicle data may be provided by data source 102 located in each of the vehicles. Alternatively, one or more data sources 102 may be located in the area of interest and may collect the vehicle data for multiple vehicles using imaging device 346.

The process may begin by analyzing the collected vehicle data to recognize queue events in the area of interest (act 402). The collected vehicle data may be analyzed in real-time in some embodiments.

A vehicle queue event occurs when a vehicle's speed is detected as being below a speed threshold or stopped in an area of interest. When a vehicle is initially detected as having a speed below the speed threshold or stopped in the area of interest, a state of the vehicle may be set to an initial low-speed state and a point at which the vehicle enters the initial low-speed state is referred to as an initial low-speed state point. Subsequently, when the vehicle is detected as having a speed below the speed threshold or stopped in the area of interest, the state of the vehicle may be set to a subsequent low-speed state and a point at which the vehicle is located while in the subsequent low-speed state is a subsequent low-speed state point.

Next, act 403 may be performed to form clusters from the initial low-speed state points. In the following examples, assume that a distance from the initial low-speed state points to an intersection is $P=\{p_1, p_2, \ldots, p_i, \ldots, p_n\}$, where $p_i$ is a distance from an initial low-speed state point of vehicle i to the intersection and n is a number of initial low-speed state points. A distance from the subsequent low-speed state points to the intersection may be denoted as $M=\{m_1, m_2, \ldots, m_i, \ldots, m_n\}$, where $m_i$ is a distance from a subsequent low-speed state point of vehicle i to the intersection and n is a number of subsequent low-speed state points.

Figure 5:
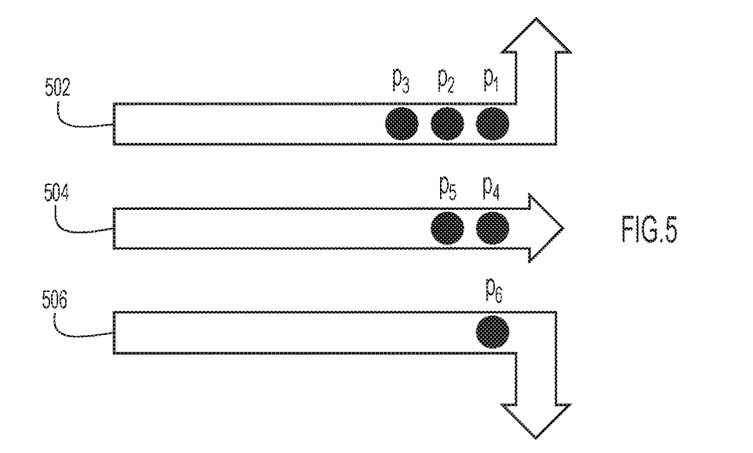
FIGS. 5-11 illustrate clustering and merging of clusters of vehicles in an initial low-speed state in an area of interest according to embodiments of the invention.
Figure 6:
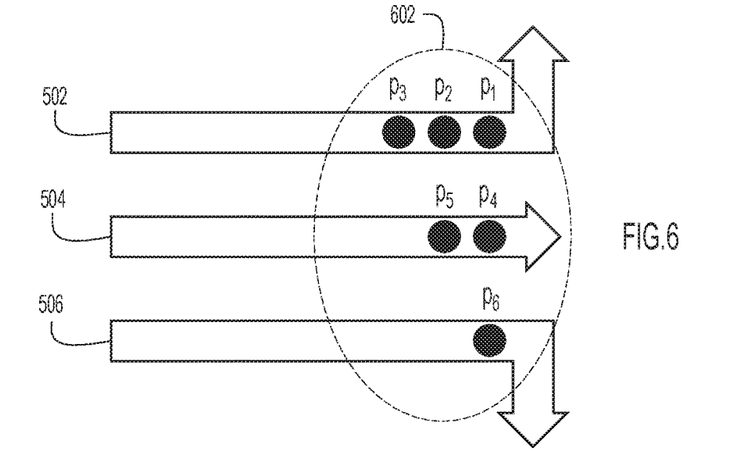

FIG. 5 illustrates an example distribution of P at an intersection during a sampling time period. A clustering model may include, but not be limited to, any of K-Means, K-Medoids, Gaussian Mixture Models (GMM), Spectral clustering and Ncut. Left turn lane 502 includes vehicles corresponding to $p_i$, $p_2$ and $p_3$. Through traffic lane 504 includes vehicles corresponding to $p_4$ and $p_5$ and right turn lane 506 includes a vehicle corresponding to $p_6$. Because there is no significant difference in length among lanes 502, 504 and 506, a clustering result may include only one cluster 602, as shown in FIG. 6. In some embodiments, a difference in length may not be considered to be significant unless the difference in length exceeds a significance threshold. The significance threshold may be two or another suitable value. Cluster 602 may be classified as an intersection queue because cluster 602 begins at the intersection.

Figure 7:
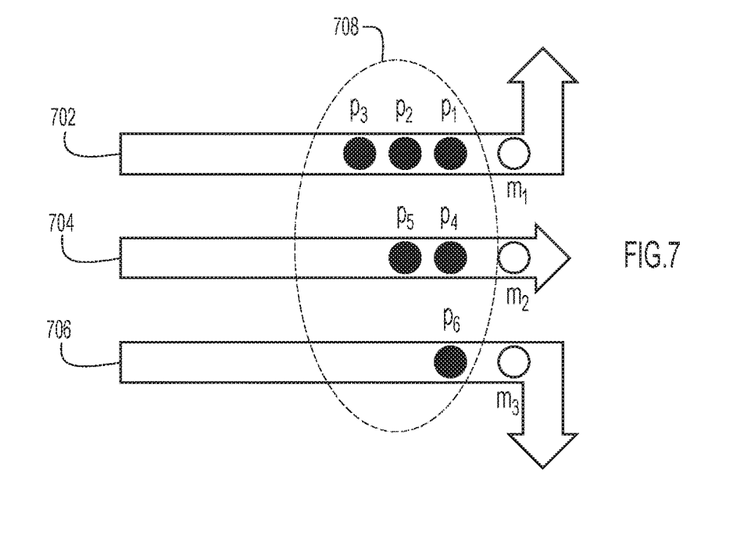

FIG. 7 illustrates example distributions P and M, where $m_1$, $m_2$ and $m_3$ are positioned, respectively, in lanes 702, 704 and 706, nearest to the intersection. P is distributed as previously described with reference to FIGS. 5 and 6, but following $m_1$, $m_2$ and $m_3$ in their respective lanes. In this example, initial low-speed state points P may be clustered as cluster 708. Cluster 708 may be classified as an intersection queue, although P does not begin at the intersection, because each lane has at least one subsequent low-speed state point between it and the intersection.

Figure 8:
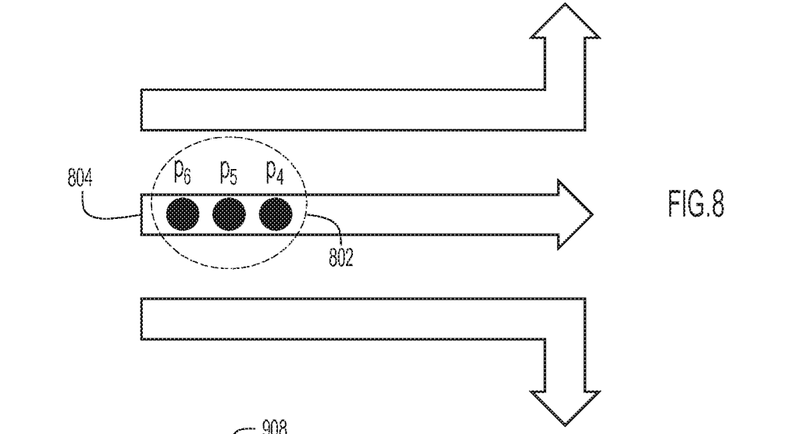

FIG. 8 illustrates an example distribution in which initial low-speed state points $p_4$, $p_5$ and $p_6$ are in through lane 804 with no other vehicles in the area on interest. In this example, cluster 802 would include the initial low-speed state points $p_4$, $p_5$ and $p_6$. However, because cluster 802 does not begin at the intersection and no other subsequent low-speed state points exist between cluster 802 and the intersection, cluster 802 may be classified as an accident queue because the queue is most likely caused by an accident.

Figure 9:
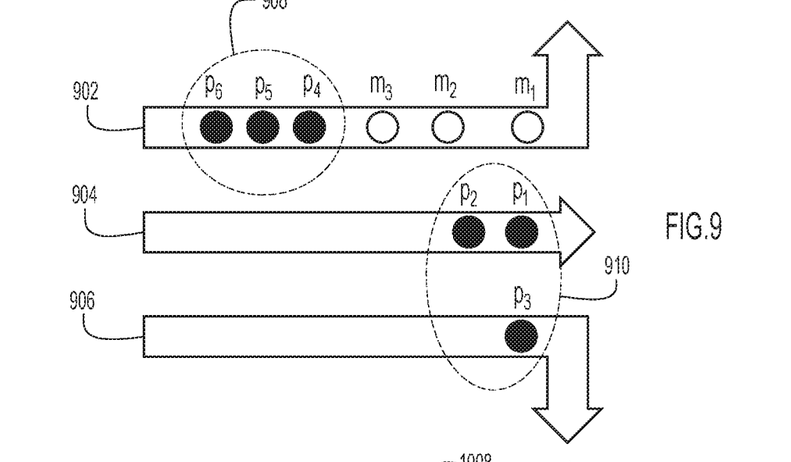

If multiple clusters are formed in the area of interest, the clusters may be merged under certain conditions. For example, FIG. 9 shows $p_4$, $p_5$ and $p_6$ following $m_1$, $m_2$ and $m_3$ in left turn lane 902, $p_1$ and $p_2$ are in through traffic lane 904 and begin at the intersection, and $p_3$ is in right turn lane 906 at the intersection. Two clusters, clusters 908 and 910 may be formed, respectively, including $p_4$, $p_5$ and $p_6$ and $p_1$, $p_2$ and $p_3$. If a distance between the two clusters, clusters 908 and 910, is greater than a cluster distance threshold, and other subsequent low-speed state points exist between the two clusters such as $m_1$, $m_2$ and $m_3$, then the two clusters may not be merged and a difference in queue length between the two queues formed by clusters 908 and 910 may be considered significant. However, if the distance between two clusters is less than the cluster distance threshold, the two clusters may be merged.

In some embodiments, the cluster distance threshold may be 100 meters (3,937 inches or 328 feet and 1 inch). In other embodiments, a different suitable value may be used. When determining a value to use for the cluster distance threshold, real traffic conditions as well as other data should be taken into consideration.

Figure 10:
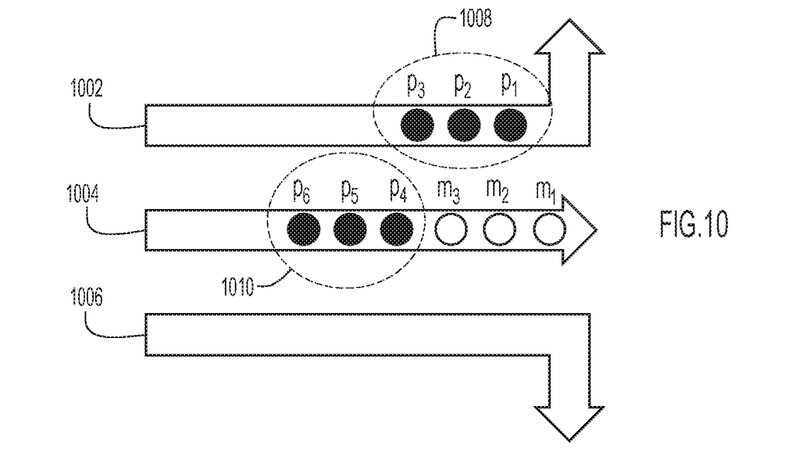

In an example shown in FIG. 10, cluster 1008, including $p_1$, $p_2$ and $p_3$ in left turn lane 1002 may form cluster 1008 and cluster 1010, including $p_4$, $p_5$ and $p_6$ in through traffic lane 1004 may form cluster 1010. Right turn lane 1006 is empty. Because through traffic lane 1004, which also includes $m_1$, $m_2$ and $m_3$, is significantly different in length from a queue formed by $p_1$, $p_2$ and $p_3$ in left turn lane 1002, clusters 1008 and 1010 may not be merged.

Figure 11:
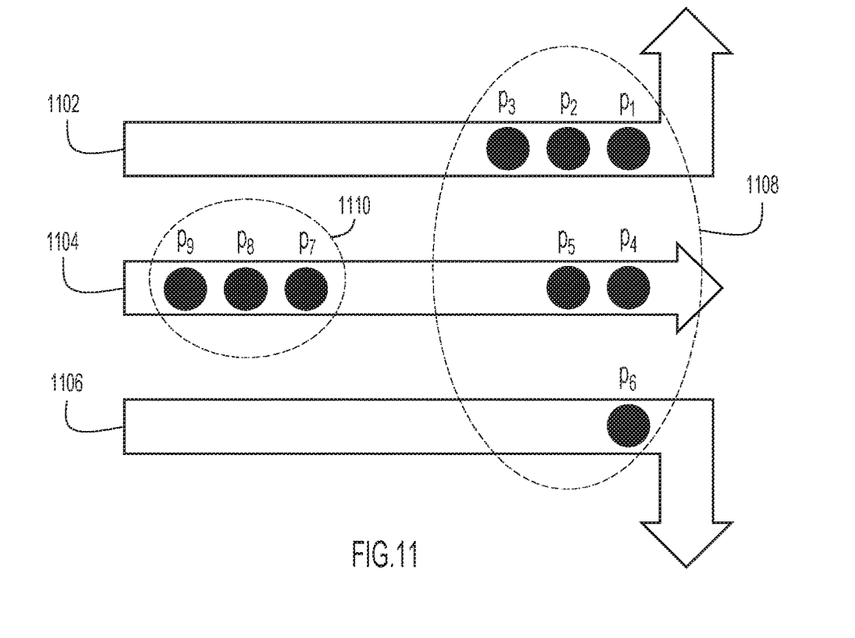

In an example shown in FIG. 11, cluster 1108 includes $p_1$, $p_2$ and $p_3$ in left turn lane 1102, $p_4$ and $p_5$ in through lane 1104, and $p_6$ in right turn lane 1106. Cluster 1110 includes $p_7$, $p_8$ and $p_9$ in through traffic lane 1104. In this example, we assume that a distance between cluster 1108 and cluster 1110 is greater than the cluster distance threshold. Because the distance is greater than the cluster distance threshold, and no subsequent low-speed state points exist between cluster 1108 and cluster 1110, then clusters 1108 and 1110 may not be merged. Cluster 1108 may be classified as an intersection queue because the cluster begins at the intersection. Cluster 1110 may be classified as an accident queue because cluster 1110 begins in a middle of a road with no subsequent low-speed state points between cluster 1110 and cluster 1108. Clusters 1108 and 1110 have no difference in length.

Returning to FIG. 4, after performing clustering to cluster a set of initial low-speed state points P and merging any resulting clusters that can be merged, if there is more than one resulting cluster, a determination may be made regarding whether there is a significant difference in queue lengths among the clusters (act 404).

To determine a queue length, the set of initial low-speed state points P may be sorted in ascending order to produce $p_1$ through $p_n$. Next, a starting point of each queue, or cluster, may be determined. If the queue is an intersection queue, then the starting point is at an end of an intersection. If the queue is an accident queue, then the starting point is a closest initial low-speed state point to the end of the intersection, which is $p_i$, where i has a smallest value from among the set of P in the queue, or cluster. Once the starting point of the queue is determined, queue length of the queue may be calculated along with a maximum value of the queue length of the queue and an average queue length of the queue, as seen over a number of sampling time periods.

A difference in queue length may be considered significant if the difference is greater than two (or another suitable value). If the difference in queue length is not considered to be significant (act 404), then queue indicators may be computed and provided to DIPP 124 (act 408).

If, during act 404, significant differences in queue length are detected, then queue direction of queues may be identified.

Figure 12:
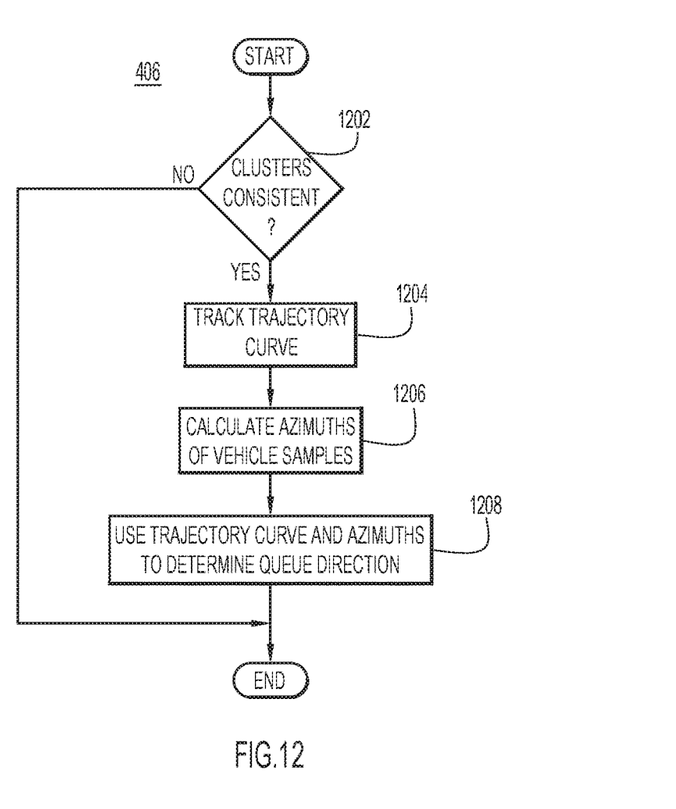
FIG. 12 is a flowchart of an example process for determining a queue direction according to embodiments of the invention.

FIG. 12 is a flowchart of an example process for determining a queue direction. The process may begin by determining consistence of clusters over multiple consecutive sampling time periods (act 1202). That is, because a queue event in one lane can last for several consecutive sampling time periods, a determination is made regarding whether each of the clusters, or queues, in the multiple consecutive sampling time periods represent a respective same queue event in a respective lane.

Figures 13, 14:
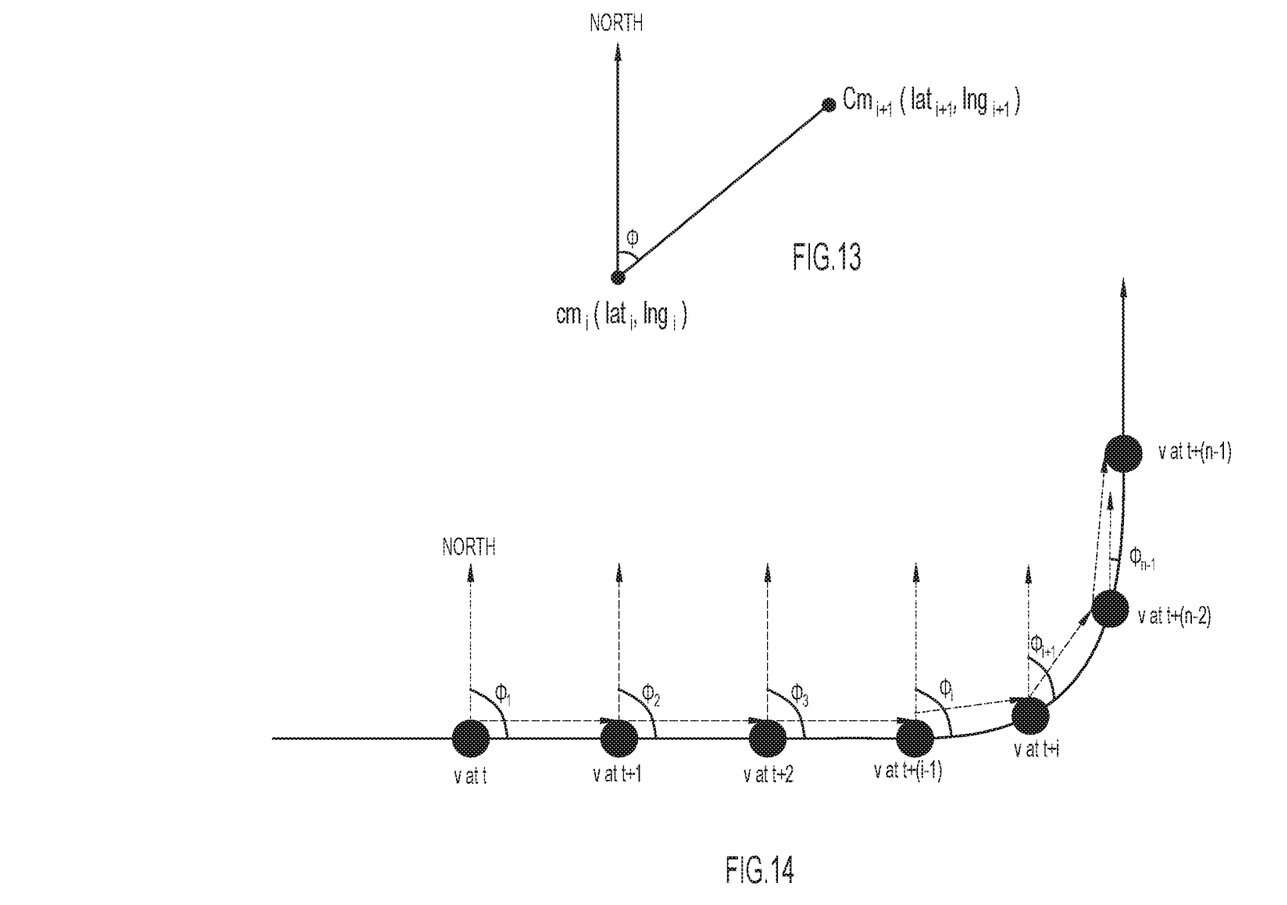
FIG. 13 shows an azimuth $\Phi$ with respect to two cluster locations from two consecutive sampling time periods.
FIG. 14 illustrates an example trajectory curve with respect to vehicle locations from multiple consecutive sampling time periods.

In various embodiments, azimuth (Az) may be used to check for consistency. Az is a vector angle between a heading direction and a true north direction. Cluster results over multiple consecutive time periods, beginning at time t, may be denoted as C={Cluster(t), Cluster(t+1), . . . , Cluster (t+i), . . . , Cluster(t+n)} and a median value of $p_i$ may be denoted as CM={($lat_1$, $lng_1$), ($lat_2$, $lng_2$), . . . , ($lat_i$, $lng_i$), . . . , ($lat_n$, $lng_n$)}, where ($lat_i$, $lng_i$) is a median latitude and longitude for a cluster at time i. First, a median value of $p_i$ per cluster in C may be calculated. Then an azimuth of two consecutive locations in CM may be calculated. With reference to FIG. 13, an angle Φ, with respect to true north may be calculated with respect to two median values of cluster i ($cm_i$($lat_i$, $lng_i$)) and cluster (i+1) ($cm_{i+1}$($lat_{i+1}$, $lng_{i+1}$)). This is equivalent to $$\Phi = \operatorname{atan}\left(\frac{\cos(lat_{i+1} \times \frac{\pi}{180}) \times (lng_{i+1} - lng_i)}{lat_{i+1} - lat_i}\right).$$

The azimuth between each pair of consecutive locations in CM may be denoted as Az={$\Phi_1$, $\Phi_2$, . . . , $\Phi_i$, . . . , $\Phi_n$}, where $\Phi_i$ is an azimuth between $cm_{i-1}$ and $cm_i$. The clusters in C are consistent if a difference in azimuth (Az) between each two consecutive pairs of locations in CM is less than a threshold. If the difference in Az between each two consecutive pairs of locations in CM is less than the threshold, then all the clusters in C represent the same queue event. This is equivalent to: |$\Phi_{i+1} - \Phi_i$|<threshold, where $\Phi_i$ is the azimuth between $cm_{i-1}$ and $cm_i$ and $\Phi_{i+1}$ is an azimuth between $cm_i$ and $cm_{i+1}$. In some embodiments, the threshold may be 2 degrees. Although, other values of the threshold may be used in other embodiments. An ideal value for the threshold depends on a number of factors including, but not limited to, an amount of real traffic, a width of a lane, GPS source data and real traffic speed.

Referring back to FIG. 12, a trajectory curve of a vehicle sampling point v may be tracked during consecutive sampling time periods (act 1204). GIS server 108 may receive the location data from the multiple consecutive sampling time periods and may calculate azimuths based on the location data from multiple consecutive pairs of sampling time periods (act 1206). Multiple location points of v per the consecutive pairs of sampling time periods may be connected to generate a trajectory curve, which may be used with the calculated azimuths to determine a queue direction (act 1208). In FIG. 14, the trajectory curve is shown as a solid line. Because Φ is decreasing and the trajectory curve is changing according to an approximate right angle, the queue direction for this example is determined to be a left turn and the lane is determined to be a left turn lane. Similarly, when the trajectory curve is approximately a straight line, then the queue direction may be determined to be straight and the lane may be determined to be a through traffic lane. Further, when a value of Φ is increasing and the trajectory curve is changing according to an approximate right angle, then the queue direction may be determined to be a right turn and the lane may be determined to be a right turn lane.

In some embodiments, queue indicators may be stored for analysis at a later time. Table 1, below, shows an example set of queue indicators. In other embodiments, other queue indicators may be computed and saved.

TABLE 1

SAMPLING TIME
QUEUE TYPE
QUEUE DIRECTION
MAXIMUM QUEUE LENGTH
AVERAGE QUEUE LENGTH
AVERAGE QUEUE SPEED
VARIANCE QUEUE SPEED
CUMULATIVE QUEUE DURATION

Sampling time is a time and a date when a sample was captured. Queue type may include may be one of an intersection queue and an accident queue. Maximum queue length may be a maximum length for a queue over multiple consecutive sampling time periods. Average queue length may be an average length of a queue over the multiple consecutive sampling time periods. Average queue speed may be an average speed of vehicles in a queue over the multiple consecutive sampling time periods. Variance queue speed may be determined by subtracting, from determined queue speeds from consecutive sampling time periods, the average queue speed for the consecutive sampling time periods, squaring the results, and determining an average of the squared results.

$$\text{Variance queue speed} = \frac{\sum_{i}^{N}(\text{speed\_of\_vechicle}_i - \text{average\_speed\_of\_queue})^2}{N},$$

where $\text{vehicle}_i$ is an $i^{th}$ vehicle in the queue and N is a number of vehicles in the queue. Cumulative queue duration is an amount of time a queue has at least one vehicle therein.

Based on analysis of the queue indicators by a computer system, roads having most frequently occurring queuing events may be detected. Further, roads having queues with maximum lengths and maximum average queue length may be detected. Traffic information may be used to adjust traffic signals at corresponding intersections to improve a flow of traffic. For example, times of traffic stoppage (duration of red light) and/or traffic flow (duration of green light) may be adjusted to reduce queue lengths. The traffic signals may be adjusted by transmitting commands through a network to corresponding traffic signal devices.

The environment of present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for detecting vehicle queue events and managing traffic flow comprising:
    recognizing, by a computing system, whether a queue event occurred for each vehicle located in an area of interest based on collected vehicle data, the area of interest including an intersection, and the vehicle data for the each vehicle including location information and speed information, the location information further including a distance to the intersection;
    identifying, by the computing system, differences in queue length among queues in the area of interest based on the vehicle data;
    determining, by the computing system, a plurality of queue indicators for each of the queues in the area of interest, the plurality of queue indicators comprising a sampling time, a queue type, a maximum queue length, an average queue length, a variance queue speed, and a cumulative queue duration; and
    managing traffic signal lights at the intersection in the area of interest based on the plurality of queue indicators for the each of the queues in the area of interest generated over a plurality of sampling periods.

2. The computer-implemented method of claim 1, further comprising:
    dynamically displaying on a display screen the plurality of queue indicators for each of the queues in the area of interest.

3. The computer-implemented method of claim 1, wherein recognizing whether the queue event occurred further comprises:
    determining a distance from an initial low-speed state point of a respective vehicle to the intersection;
    performing clustering of points representing the respective vehicles based on the determined distances for each of the respective vehicles to produce at least one clustered result;
    classifying each of the at least one clustered result, the each of the at least one clustered result being a respective queue;
    determining a maximum value of a distance to the intersection within each respective queue; and
    determining an average value of the distance to the intersection within the each respective queue.

4. The computer-implemented method of claim 3, wherein the classifying the each of the at least one clustered result further comprises:
    merging a pair of the plurality of clusters when a distance between the pair of the plurality of clusters is less than a cluster distance threshold; and
    when the distance between the pair of clusters is greater than the cluster distance threshold and at least one vehicle in a subsequent low-speed state is located between the pair of clusters, identifying a queue direction of a respective queue from each cluster of the pair of clusters.

5. The computer-implemented method of claim 4, wherein the identifying a queue direction of the respective queue further comprises:
    calculating respective median values of a distance to the intersection per cluster in a cluster set C;
    calculating a respective azimuth $\Phi$ between each of the pairs of consecutive locations in median values;
    tracking a trajectory curve of a vehicle sample point during multiple consecutive sampling periods; and
    determining the queue direction based on how the azimuth and the trajectory curve of the vehicle sample point change over the multiple consecutive sampling periods.

6. The computer-implemented method of claim 1, further comprising:
    determining which queues of a plurality of areas interest have a most frequently occurring number of different queue events; and
    reconfiguring the traffic signal lights based on queues of the plurality of queues of the plurality of areas of interest having the most frequently occurring number of different queue events.

* * * * *